United States Patent
Kim et al.

(10) Patent No.: US 11,719,793 B2
(45) Date of Patent: Aug. 8, 2023

(54) APPARATUS AND METHOD FOR CLEANING LIDAR SENSOR

(71) Applicant: HYUNDAI MOBIS Co., Ltd., Seoul (KR)

(72) Inventors: Young Shin Kim, Yongin-si (KR); Kyung Rin Kim, Yongin-si (KR); Sung Eun Jo, Yongin-si (KR); Won Gyum Kim, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 1081 days.

(21) Appl. No.: 16/357,326

(22) Filed: Mar. 19, 2019

(65) Prior Publication Data

US 2019/0353761 A1  Nov. 21, 2019

(30) Foreign Application Priority Data

May 15, 2018 (KR) .................. 10-2018-0055642

(51) Int. Cl.
*B08B 3/02* (2006.01)
*G01S 7/497* (2006.01)
*G01S 17/08* (2006.01)

(52) U.S. Cl.
CPC ............ *G01S 7/497* (2013.01); *B08B 3/02* (2013.01); *G01S 17/08* (2013.01); *G01S 2007/4977* (2013.01)

(58) Field of Classification Search
None
See application file for complete search history.

(56) References Cited

U.S. PATENT DOCUMENTS

| | | | |
|---|---|---|---|
| 7,839,491 B2 | 11/2010 | Harris et al. | |
| 2008/0210881 A1 | 9/2008 | Harris et al. | |
| 2015/0090291 A1 | 4/2015 | Na et al. | |
| 2016/0176384 A1 | 6/2016 | Dissette et al. | |
| 2018/0009418 A1* | 1/2018 | Newman | B08B 3/02 |
| 2018/0017683 A1* | 1/2018 | Tateishi | G05D 1/0268 |
| 2018/0370500 A1* | 12/2018 | Garcia Crespo | A47L 5/28 |

FOREIGN PATENT DOCUMENTS

| | | |
|---|---|---|
| JP | 2009503486 A | 1/2009 |
| KR | 10-2015-0035204 | 4/2015 |

OTHER PUBLICATIONS

Office Action dated Oct. 21, 2021 from the Korean Patent Office for Korean Patent Application No. 10-2018-0055642.
Office Action dated Nov. 4, 2022 from the Chinese Patent Application No. 201910122538.2.

* cited by examiner

*Primary Examiner* — Cristi J Tate-Sims
(74) *Attorney, Agent, or Firm* — H.C. Park & Associates, PLC

(57) ABSTRACT

An apparatus for cleaning a lidar sensor may include: a signal analyzer configured to distinguish foreign matters adhering to a window cover, using a signal inputted from a laser receiver of a lidar sensor; a cleaner configured to remove the foreign matters adhering to the window cover; and a controller configured to control the cleaner according to the foreign matters distinguished by the signal analyzer.

13 Claims, 3 Drawing Sheets

APPARATUS AND METHOD FOR CLEANING LIDAR SENSOR

CROSS-REFERENCES TO RELATED APPLICATION

This application claims priority from and the benefit of Korean Patent Application No. 10-2018-0055642, filed on May 15, 2018, which is hereby incorporated by reference for all purposes as if set forth herein.

BACKGROUND

Field

Exemplary embodiments relate to an apparatus and method for cleaning a lidar (light detection and ranging) sensor, and more particularly, to an apparatus and method for cleaning a lidar sensor, which can remove foreign matters adhering to a window cover of a lidar sensor.

Discussion of the Background

The autonomous driving level 3 requires functions such as highway autonomous driving and autonomous parking. Thus, the need for a lidar sensor with high distance resolution is increasing. Such a lidar sensor senses an object or structure by sensing areas at the front and rear of the vehicle.

In general, the lidar sensor is mounted on the front bumper, and exposed to the outside. When the lidar sensor is installed in another structure such as a vehicle body or glass, the sensing performance of the lidar sensor may be significantly degraded. Thus, the lidar sensor needs to be exposed to the outside when mounted.

Typically, the lidar sensor includes a laser transmitter, a laser receiver and a driver, and separately includes a cover for protecting the sensor from external foreign matters.

Since the lidar sensor senses a distance through a process of transmitting/receiving light, the lidar sensor is very sensitive to contamination of the cover. Therefore, it is necessary to prevent contamination of the lidar sensor, in order to maintain the performance of the lidar sensor. Conventionally, however, much research has not been conducted on a method for cleaning a lidar sensor.

The above information disclosed in this Background section is only for enhancement of understanding of the background of the invention and, therefore, it may contain information that does not constitute prior art.

SUMMARY

Exemplary embodiments of the present invention provide an apparatus and method for cleaning a lidar sensor, which can distinguish foreign matters by analyzing a signal characteristic of a signal outputted from a lidar sensor, and clean the lidar sensor according to the distinguished foreign matters, thereby preventing a reduction in performance of the lidar sensor.

Additional features of the invention will be set forth in the description which follows, and in part will be apparent from the description, or may be learned by practice of the invention.

In one embodiment, an apparatus for cleaning a lidar sensor may include: a signal analyzer configured to distinguish foreign matters adhering to a window cover, using a signal inputted from a laser receiver of a lidar sensor; a cleaner configured to remove the foreign matters adhering to the window cover; and a controller configured to control the cleaner according to the foreign matters distinguished by the signal analyzer.

The signal analyzer may distinguish the foreign matters by analyzing a signal characteristic of the signal inputted from the laser receiver of the lidar sensor.

The signal characteristic may include one or more of a signal magnitude, detection pattern and detection region of the signal inputted from the laser receiver of the lidar sensor, information on whether the foreign matters move, and information on whether an echo signal is received.

The signal analyzer may distinguish the foreign matters depending on whether the signal characteristic satisfies preset conditions for distinguishing the foreign matters.

The signal analyzer may distinguish the foreign matters based on whether the signal characteristic satisfies one or more of the conditions.

The controller may control the cleaner to remove the foreign matters adhering to the window cover, according to a cleaning method set for each of the foreign matters adhering to the window cover.

The cleaner may include one or more of a wash solution sprayer configured to spray a wash solution onto the window cover, an air sprayer configured to spray air onto the window cover, a dryer configured to dry the window cover by heating the window cover, and a wiper driver configured to drive a wiper to remove moisture on the window cover.

The signal analyzer may distinguish the foreign matters adhering to the window cover into one or more of dust, moisture, rain or snow, hail and mud.

In another embodiment, a method for cleaning a lidar sensor may include:

distinguishing, by a signal analyzer, foreign matters adhering to a window cover, using a signal inputted from a laser receiver of a lidar sensor; and removing, by a controller, the foreign matters adhering to the window cover by controlling the cleaner according to the foreign matters distinguished by the signal analyzer.

In the distinguishing of the foreign matters, the signal analyzer may distinguish the foreign matters by analyzing a signal characteristic of the signal inputted from the laser receiver of the lidar sensor.

The signal characteristic may include one or more of a signal magnitude, detection pattern and detection region of the signal inputted from the laser receiver of the lidar sensor, information on whether the foreign matters move, and information on whether an echo signal is received.

In the distinguishing of the foreign matters, the signal analyzer may distinguish the foreign matters according to whether the signal characteristic satisfies preset conditions for distinguishing the foreign matters.

In the distinguishing of the foreign matters, the signal analyzer may distinguish the foreign matters based on whether the signal characteristic satisfies one or more of the conditions.

In the removing of the foreign matters, the controller may remove the foreign matters adhering to the window cover by controlling the cleaner according to a cleaning method set for each of the foreign matters adhering to the window cover.

The cleaner may include one or more of a wash solution sprayer configured to spray a wash solution onto the window cover, an air sprayer configured to spray air onto the window cover, a dryer configured to dry the window cover by heating the window cover, and a wiper driver configured to drive a wiper to remove moisture on the window cover.

The signal analyzer may distinguish the foreign matters adhering to the window cover into one or more of dust, moisture, rain or snow, hail and mud.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
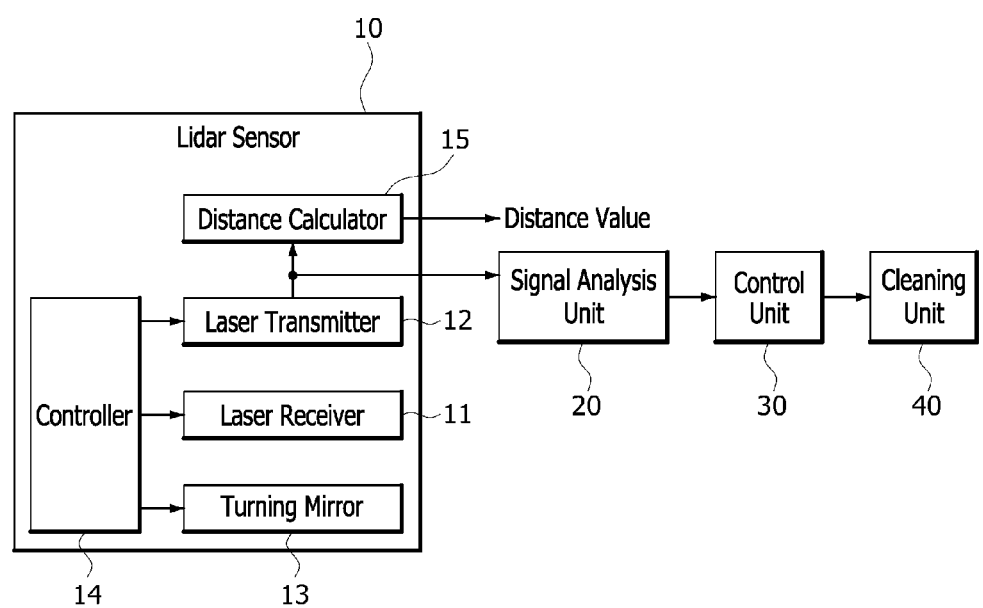
FIG. 1 is a block diagram illustrating an apparatus for cleaning a lidar sensor in accordance with an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereafter, an apparatus and method for cleaning a lidar sensor in accordance with an embodiment of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 2:
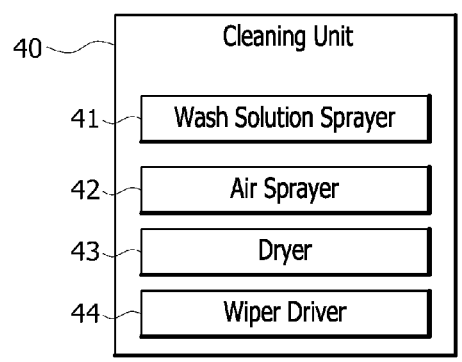
FIG. 2 is a block diagram illustrating a cleaner in accordance with the embodiment of the present invention.

FIG. 1 is a block diagram illustrating an apparatus for cleaning a lidar sensor in accordance with an embodiment of the present invention, and FIG. 2 is a block diagram illustrating a cleaning unit in accordance with the embodiment of the present invention.

Referring to FIG. 1, the apparatus for cleaning a lidar sensor in accordance with the embodiment of the present invention may include a signal analysis unit 20, a control unit 30 and a cleaning unit 40.

The signal analysis unit 20 may analyze a signal inputted from a laser receiver 12 of a lidar sensor 10, and distinguish foreign matters adhering to a window cover (not illustrated) according to the signal characteristic of the signal.

The lidar sensor 10 may include a laser transmitter 11, a laser receiver 12, a turning mirror 13, a controller 14 and a distance calculator 15.

The laser transmitter 11 may emit light in a preset wavelength band in order to measure a distance from a target outside. The wavelength band of the light emitted from the laser transmitter 11 may not be specifically limited.

The laser receiver 12 may receive light which is emitted from the laser transmitter 11 and reflected from the target, convert the received light into an electrical signal, and then input the electrical signal to the distance calculator 15.

The turning mirror 13 may be installed on an optical path on which light is transmitted/received by the laser transmitter 11 or the laser receiver 12, and turned to reflect the transmitted or received light.

The controller 14 may control the laser transmitter 11 to emit light to the target, control the laser receiver 12 to receive light reflected from the target, and control the turning mirror 13 to adjust the optical path.

The distance calculator 15 may calculate the distance from the target using the signal outputted from the laser receiver 12, i.e. a pulse signal.

For reference, FIG. 1 schematically illustrates the main parts of the lidar sensor 10, and the components and operations of the lidar sensor 10 may not be limited to the above-described embodiment, but added or changed in various manners.

The signal analysis unit 20 may detect the signal characteristic by analyzing the signal inputted to the distance calculator 15 from the laser receiver 12 of the lidar sensor 10, and distinguish foreign matters adhering to the window cover of the lidar sensor 10 according to the detected signal characteristic.

The signal analysis unit 20 may distinguish foreign matters which may adhere to the window cover of the lidar sensor 10 and reduce the performance of the lidar sensor 10. In this case, the signal analysis unit 20 may distinguish the foreign matters into one or more of dust, moisture, rain or snow, hail and mud.

In the present embodiment, it has been described that the signal analysis unit 20 distinguishes the foreign matters into dust, moisture, rain or snow, hail and mud. However, the scope of the present invention is not limited thereto, but the foreign matters may further include other foreign matters which can degrade the performance of the sensor.

The signal characteristic may include any one of a signal magnitude, a detection pattern, a detection region, information on whether foreign matters move, and information on an echo signal is received.

The signal characteristics such as the signal magnitude, the detection pattern, the detection region, the information on whether foreign matters move, and the information on whether the echo signal is received may vary depending on foreign matters. According to the signal characteristics, the foreign matters adhering to the window cover may be detected.

The signal characteristics for the respective foreign matters may be summarized as in Table 1 below.

TABLE 1

Signal characteristics for foreign matters

| Signal characteristic | Dust | Moisture | Rain or snow | Hail | Mud |
|---|---|---|---|---|---|
| Signal magnitude | Small | Small | Intermediate | Large | Large |
| Detection pattern | Area pattern | Area pattern | Dot pattern | Dot pattern | Area pattern |
| Detection region | Entire | Entire | Partial | Partial | Entire or partial |
| Movement of foreign matters | Not move | Not move | Move | Move | Move or not |
| Echo signal | Received | Received | Received or not | Not received | Not received |

The signal analysis unit 20 may distinguish the foreign matters depending on whether each of the foreign matters satisfies preset conditions.

For example, when the signal magnitude is small, the detection pattern is an area pattern, the detection region is the entire region, the foreign matter does not move, and the echo signal is received as in Table 1, the signal analysis unit 20 may determine that the corresponding foreign matter is dust.

When the signal magnitude is small, the detection pattern is an area pattern, the detection region is the entire region, the foreign matter does not move, and the echo signal is received, the signal analysis unit 20 may determine that the corresponding foreign matter is moisture.

When the signal magnitude is intermediate, the detection pattern is a dot pattern, the detection region is a partial region, and the foreign matter moves, the signal analysis unit 20 may determine that the corresponding foreign matter is rain or snow. When the foreign matter is rain or snow, the echo signal may be received or not.

When the signal magnitude is large, the detection pattern is a dot pattern, the detection region is a partial region, the foreign matter moves, and the echo signal is not received, the signal analysis unit 20 may determine that the corresponding foreign matter is hail.

When the signal magnitude is large, the detection pattern is an area pattern, and the echo signal is not received, the signal analysis unit 20 may determine that the corresponding foreign matter is mud. When the foreign matter is mud, the detection region may be a partial region or the entire region, and the foreign matter may move or not.

Among the signal characteristics for each of the foreign matters, the signal magnitude may be divided into three regions of 'small', 'intermediate' and 'large'.

Furthermore, when the foreign matters are determined, all of the above-described conditions do not need to be satisfied. Although a part of the conditions is satisfied, the foreign matters can be distinguished. That is, the signal analysis unit 20 may distinguish the foreign matters even though the foreign matters satisfy one or more of the conditions.

The cleaning unit 40 may remove the foreign matters using a preset cleaning method depending on the foreign matters adhering to the window cover.

Referring to FIG. 2, the cleaning unit 40 may include a wash solution sprayer 41 which sprays a wash solution onto the window cover, an air sprayer 42 which sprays air onto the window cover, a dryer 43 which dries the window cover by heating the window cover, and a wiper driver 44 which drives a wiper to remove water on the window cover. The dryer 43 may include a hot wire.

Therefore, according to a control signal of the control unit 30, one or more of the wash solution sprayer 41, the air sprayer 42, the dryer 43 and the wiper driver 44 may be driven to remove foreign matters on the surface of the window cover.

When a foreign matter is detected by the signal analysis unit 20, the control unit 30 may control the cleaning unit 40 to remove the foreign matter adhering to the window cover, according to a cleaning method set for the corresponding foreign matter.

That is, when the foreign matter is detected as dust by the signal analysis unit 20, the control unit 30 may drive the wash solution sprayer 41 to spray the wash solution, and then drive the air sprayer 42 to spray air, thereby removing the dust.

When the foreign matter is detected as moisture by the signal analysis unit 20, the control unit 30 may drive the dryer 43 to heat the window cover, thereby removing the moisture.

When the foreign matter is detected as rain or snow by the signal analysis unit 20, the control unit 30 may drive the dryer 43 to the heat the window cover, and drive the wiper driver 44 to remove the rain or snow.

When the foreign matter is detected as hail by the signal analysis unit 20, the control unit 30 may drive the dryer 43 to the heat the window cover, and drive the wiper driver 44 to remove the hail.

When the foreign matter is detected as mud by the signal analysis unit 20, the control unit 30 may drive the wash solution sprayer 41 to spray the wash solution, and then drive the air sprayer 42 to spray air, thereby removing the mud.

Hereafter, a method for cleaning a lidar sensor in accordance with an embodiment of the present invention will be described in detail with reference to FIG. 3.

Figure 3:
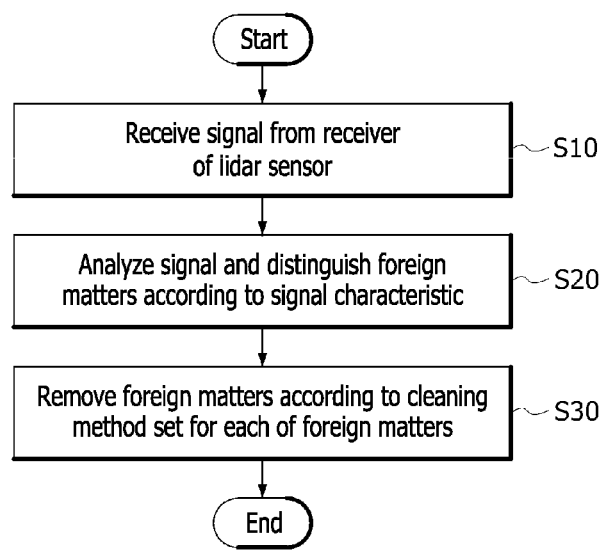
FIG. 3 is a flowchart illustrating a method for cleaning a lidar sensor in accordance with an embodiment of the present invention.

FIG. 3 is a flowchart illustrating a method for cleaning a lidar sensor in accordance with an embodiment of the present invention.

Referring to FIG. 3, the signal analysis unit 20 may receive a signal from the laser receiver 12 of the lidar sensor 10 at step S10. Then, the signal analysis unit 20 may analyze the received signal and distinguish foreign matters adhering to the window cover according to the signal characteristics, at step S20. The foreign matters may be distinguished into one or more of dust, moisture, rain or snow, hail and mud.

That is, the signal analysis unit 20 may distinguish the foreign matters into one or more of dust, moisture, rain or snow, hail and mud, based on any one of the signal characteristics, for example, a signal magnitude, a detection pattern, a detection region, information on whether the foreign matters moves, and information on whether an echo signal is received.

In this case, the signal analysis unit 20 can detect a foreign matter when the corresponding foreign matter satisfies all of the conditions set for each of the foreign matters. However, the signal analysis unit 20 can detect a foreign matter even though the corresponding foreign matter satisfies a part of the conditions.

When the foreign matter is detected by the signal analysis unit 20, the control unit 30 may control the cleaning unit 40 to remove the foreign matter adhering to the window cover, according to the corresponding foreign matter, at step S30.

That is, according to the foreign matter detected by the signal analysis unit 20, the control unit 30 may appropriately remove the corresponding foreign matter by driving one or more of the wash solution sprayer 41 to spray the wash solution onto the window cover, the air sprayer 42 to spray air onto the window cover, the dryer 43 to dry the window cover by heating the window cover, and the wiper driver 44 to drive the wiper to remove moisture on the window cover.

In accordance with the embodiments of the present invention, the apparatus and method for cleaning a lidar sensor can distinguish foreign maters by analyzing a signal outputted from the lidar sensor, and clean the lidar sensor according to the distinguished foreign matters, thereby preventing a reduction in performance of the lidar sensor.

Although exemplary embodiments of the present disclosure have been shown and described hereinabove, the present disclosure is not limited to specific exemplary embodiments described above, but may be various modified by those skilled in the art to which the present disclosure pertains without departing from the scope and spirit of the disclosure as disclosed in the accompanying claims. In addition, such modifications should also be understood to fall within the scope and spirit of the present disclosure.

What is claimed is:

1. A lidar sensor, comprising:
   a signal analyzer to distinguish foreign matter adhering to a window cover, using a signal input from a laser receiver of the lidar sensor;
   a cleaner to remove the foreign matters adhering to the window cover; and
   a controller to control the cleaner according to the type of foreign matter distinguished by the signal analyzer,
   wherein the signal analyzer distinguishes the foreign matter by analyzing a signal characteristic of the signal input from the laser receiver of the lidar sensor, and
   wherein the signal characteristic comprises one or more of a signal magnitude, detection pattern and detection region of the signal inputted from the laser receiver of the lidar sensor, information on whether the foreign matters move, and information on whether an echo signal is received.

2. The apparatus of claim 1, wherein the signal analyzer distinguishes foreign matter depending on whether the signal characteristic satisfies preset conditions for distinguishing foreign matters.

3. The apparatus of claim 2, wherein the signal analyzer distinguishes foreign matter based on whether the signal characteristic satisfies one or more of the preset conditions.

4. The apparatus of claim 1, wherein the controller controls the cleaner to remove foreign matter adhering to the window cover, according to a cleaning method set for each type of the foreign matter adhering to the window cover.

5. The apparatus of claim 1, wherein the cleaner comprises each of a wash solution sprayer to spray a wash solution onto the window cover, an air sprayer to spray air onto the window cover, a dryer to dry the window cover by heating the window cover, and a wiper driver to drive a wiper to remove moisture on the window cover.

6. The apparatus of claim 1, wherein the signal analyzer distinguishes the foreign matter adhering to the window cover into one or more of dust, moisture, rain or snow, hail and mud.

7. The apparatus of claim 1, wherein the signal analyzer comprises a signal analysis unit, the cleaner comprises a cleaning unit, and the controller comprises a control unit.

8. A method for cleaning a lidar sensor, comprising:
   distinguishing foreign matter adhering to a window cover, using a signal input from a laser receiver of a lidar sensor; and
   removing the foreign matter adhering to the window cover by controlling a cleaner according to the type of foreign matters distinguished,
   wherein the step of distinguishing of foreign matter is performed by a signal analyzer that distinguishes the type of foreign matter by analyzing a signal characteristic of the signal inputted from the laser receiver of the lidar sensor, and
   wherein the signal characteristic comprises one or more of a signal magnitude, detection pattern and detection region of the signal inputted from the laser receiver of the lidar sensor, information on whether the foreign matter moves, and information on whether an echo signal is received.

9. The method of claim 8, wherein in the step of distinguishing of foreign matter is performed by a signal analyzer that distinguishes the foreign matter according to whether the signal characteristic satisfies preset conditions for distinguishing the foreign matters.

10. The method of claim 9, wherein in the step of distinguishing of foreign matter is performed by a signal analyzer that distinguishes the foreign matter based on whether the signal characteristic satisfies one or more of the preset conditions.

11. The method of claim 8, wherein the step of removing of foreign matter is performed by a controller that removes foreign matter adhering to the window cover by controlling the cleaner according to a cleaning method set for each type of foreign matter adhering to the window cover.

12. The method of claim 8, wherein the cleaner is a cleaner unit comprising each of a wash solution sprayer configured to spray a wash solution onto the window cover, an air sprayer configured to spray air onto the window cover, a dryer configured to dry the window cover by heating the window cover, and a wiper driver configured to drive a wiper to remove moisture on the window cover.

13. The method of claim 8, wherein the signal analyzer distinguishes foreign matter adhering to the window cover into one or more of dust, moisture, rain or snow, hail and mud.

* * * * *